United States Patent … US 9,425,989 B2
Prokopi et al. … Aug. 23, 2016

(54) SOCIAL NETWORK ENABLER

(75) Inventors: Maria Prokopi, London (GB); Menuka Jain, Middlesex (GB)

(73) Assignee: FRANCE TELECOM, Paris (FR)

( * ) Notice: Subject to any disclaimer, the term of this patent is extended or adjusted under 35 U.S.C. 154(b) by 0 days.

(21) Appl. No.: 13/435,796

(22) Filed: Mar. 30, 2012

(65) Prior Publication Data

US 2012/0259931 A1  Oct. 11, 2012

(30) Foreign Application Priority Data

Mar. 31, 2011 (EP) .................................... 11305375

(51) Int. Cl.
- *G06F 15/16* (2006.01)
- *H04L 12/58* (2006.01)
- *G06Q 10/10* (2012.01)

(52) U.S. Cl.
CPC .............. *H04L 12/58* (2013.01); *G06Q 10/107* (2013.01); *H04L 12/581* (2013.01); *H04L 12/5855* (2013.01); *H04L 51/04* (2013.01); *H04L 51/14* (2013.01)

(58) Field of Classification Search
CPC ........ G06F 15/16; H04L 12/588; H04L 51/32
USPC ......................................................... 709/206
See application file for complete search history.

(56) References Cited

U.S. PATENT DOCUMENTS

| 2002/0099681 | A1 | 7/2002 | Gainey et al. | |
| 2008/0183814 | A1 | 7/2008 | Sanghavi | |
| 2010/0199340 | A1* | 8/2010 | Jonas et al. | 726/8 |
| 2010/0211642 | A1* | 8/2010 | Campagna | 709/206 |
| 2011/0107239 | A1* | 5/2011 | Adoni et al. | 715/757 |

FOREIGN PATENT DOCUMENTS

WO   2010025343 A1   3/2010

OTHER PUBLICATIONS

European Search Report and Written Opinion dated Aug. 18, 2011 for corresponding European Application No. 11 30 5375, filed Mar. 31, 2011.

\* cited by examiner

*Primary Examiner* — Vivek Srivastava
*Assistant Examiner* — Sibte Bukhari
(74) *Attorney, Agent, or Firm* — David D. Brush; Westman, Champlin & Koehler, P.A.

(57) ABSTRACT

A method and apparatus are provided for connecting a first group of users from at least one first social network with users from at least one second social network. The first group of users is registered on the second social network as a generic first user. The method is carried out by a network scheduler and includes collecting a first message from at least one second user from the second social network intended to the generic first user, selecting a user from the first group of users based on a predefined criterion, and providing the first message to the selected user and presenting the second user as the sender of the first message.

7 Claims, 4 Drawing Sheets

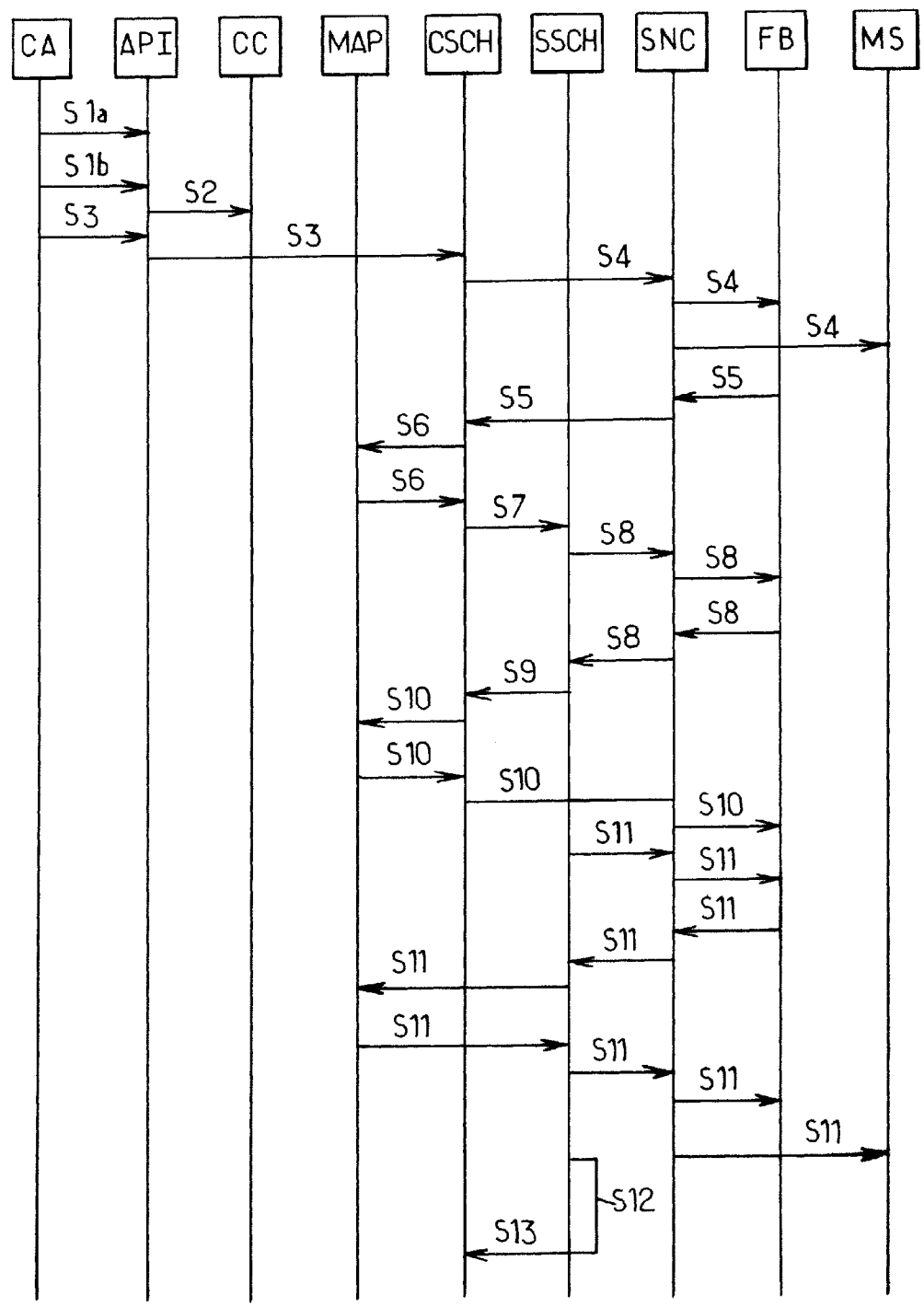

SOCIAL NETWORK ENABLER

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure generally relates to communication management in a network, and in particular in social networks.

It finds applications, in particular while not exclusively, in call centres of enterprises, educational services or end user cross social network communication.

BACKGROUND OF THE DISCLOSURE

Over the last few years, the popularity and the development of social networks has strongly increased. Indeed, an important number of social networks exist in parallel. Consequently, there has been a rising number of enterprises wanting to further leverage the benefits of this trend.

However, the possibilities to bind several networks are limited.

For example, a user A from Facebook™ cannot write an email to a user B from LinkedIn™ as neither is visible on the other network.

Solutions such as social network aggregators have been implemented in order to aggregate several social networks and to provide them to end users.

Nevertheless, these solutions do not fully comply with enterprises wishing to utilise and explore the potential of social networks, thus causing the following shortcomings.

Although the aggregators enable to update information to multiple social networks, contacts of different social networks cannot be interconnected.

In addition, enterprises are currently sceptical about using social networks as all information is publicly available. Furthermore, if enterprises expose a social account to customers, all the information associated with this social account are available as no levels of private grouping are currently possible in the popular social networks.

Furthermore, enterprises that need to create their own social network for privacy reasons cannot do so at the moment, because there is no conception of creation of private social networks.

SUMMARY

To address these needs, a first aspect of the invention relates to a method for connecting a first group of users from at least one first social network with users from at least one second social network, the first group of users being registered on the second social network as a generic first user, the method further comprising the following steps carried out by a network scheduler:

collecting a first message from at least one second user from the second social network intended to the generic first user;

selecting a user from the first group of users based on a predefined criterion;

providing the first message to the selected user and presenting the second user as the sender of the first message.

An exemplary embodiment of the present invention enables to connect users from different social networks without changing the architecture of existing networks.

The at least one second user can designate a single user. Thus, an embodiment of the present invention will enable an operator or Internet Service Provider (ISP) to offer cross social network communication services to its customers. For example an end user who is a member of one social network will be able to communicate or to exchange messages with his/her contact who is a member of another social network.

The at least one second user can also designate a group of several second users. Thus, an embodiment of the present invention enables to connect groups which are registered on different social networks. In addition the several second users may be split between several second social networks. In this case, the generic first user is registered on each second social network comprising second users. The several second users can be grouped together based on common characteristics. For example, all the customers of an enterprise, which are registered on several second social networks, can be grouped together and send a first message to the generic first user, which represents the first group of users. The users from the first group of users can also be grouped based on common characteristics. For example, the first group of users can comprise the suppliers of the enterprise for example, which can be registered on a plurality of first social networks.

An embodiment of the present invention is a very cost effective solution for enterprises, and especially for Small and Medium Enterprises, to use existing social networks to provide services to customers. Indeed, the method according to an embodiment of the invention can be carried out without modifying the architectures of the existing social networks because the network scheduler ensures the connectivity between the social networks. In addition, an embodiment of the present invention is a future proof solution as workforce of enterprises in future is accustomed to work with social network communities.

Furthermore, an embodiment of the present invention is reusable as enterprises do not have to create their own logic to provide services to their customers or partners. It also enables to personalize a service to a customer as he can use his favourite network to communicate with the enterprise.

Another advantage of an embodiment of the present invention is that Niche Services can be offered to customers, which is a very flexible solution for customers as they are connected via social networks.

The users, suppliers and customers for example, can be geographically dispersed. The customers and the suppliers of an enterprise can be served from different parts of the world, which is useful not only for enterprises but for other companies such as charities and for educational purposes. In addition, an embodiment of the present invention can handle surge in traffic in certain scenarios like events, disasters, etc.

An embodiment of the present invention also allows creation of private communities using the existing public communities from social networks.

Different communities can be connected to each other with the help of an embodiment of the present invention. For example, a customer from Facebook™ can be served by a supplier from Twitter™. Moreover, enterprise privacy can be maintained with the help of virtual communities created by an embodiment of the present invention.

An embodiment of the present invention enables an enterprise to get advantage over competitors in leading in customer care services, enterprise solutions and for Small to Medium Enterprises, education centres and charities. The enterprise can also attract more business customers, especially Small to Medium Enterprises, where they can personalize and tailor existing services as per their needs. A service provider can also create innovative services on top of the network scheduler.

In one embodiment of the invention, the method further comprises:

intercepting a second message sent from the selected user and intended to the second user;

providing the second message to the second user and presenting the generic first user as the sender of the second message.

Thus, an embodiment of the invention enables to ensure a bidirectional connection between users from different networks. In addition, as the generic first user is presented as the sender of the second message, it ensures confidentiality for the selected user. In some cases, for example if the second message is sent by a supplier in response to a first message of a customer, the confidentiality of the supplier is ensured.

In one embodiment of the invention, the method further comprises transmitting to a database adapted to communicate with the network scheduler a first identifier of the selected user and a second identifier of the second user, the first and second identifiers being associated in the database.

This embodiment enables advantageously to store connections established between users from different social networks. Thus, a mapping is created and an historic of the connections can be maintained in order to calculate statistics for example about the relationships between various communities from different social networks.

In complement, a time period being predefined, the associated first and second identifiers are deleted in the database after every time period.

This embodiment enables to update the established connections of the network scheduler and to ensure ample storage space in the database.

In complement or in variant, the method further comprises:

collecting a third message from a third user from the second social network intended to the generic first user;

if an identifier of the third user is associated with an identifier of a given user of the first group of users in the database, providing the third message to the given user and presenting the third user as the sender of the third message.

This embodiment enables to memorize the connections between users of different social networks in order to simplify the step of selection of a user from the first network.

According to one embodiment of the invention, the at least one second user is a second group of users from the second social network, the second group of users being registered on the first social network as a generic second user and when providing the first message to the selected user, the generic second user is presented as the sender of the first message.

This embodiment enables to ensure bidirectional confidentiality because on each network, users receive messages sent by a group of users registered on the network. Thus, in the case of a connection between suppliers and customers, the confidentiality of customers is also ensured.

Another aspect of the invention concerns a computer program product recorded on a storage medium and executable by a computer in the form of a software agent including at least one software module setup to implement the method according to any one of the previously described embodiments.

Another aspect of the invention concerns a network scheduler for connecting a first group of users from at least one first social network with users from at least one second social network, the first group of users being registered on the second social network as a generic first use, the network scheduler comprising:

a receiver for collecting a first message from at least one second user from the second social network intended to the generic first user;

a selecting unit for selecting a user from the first group of users based on a predefined criterion;

a transmitter for providing the first message to the selected user and presenting the second user as the sender of the first message.

Another aspect of the invention concerns a system comprising at least one first social network, at least one second social network and a network scheduler for connecting a first group of users from the first social network with users from the second social network, the first group of users being registered on the second social network as a generic first user, the network scheduler comprising:

a receiver for collecting a first message from at least one second user from the second social network intended to the generic first user;

a selecting unit for selecting a user from the first group of users based on a predefined criterion;

a transmitter for providing the first message to the selected user and presenting the second user as the sender of the first message.

In one embodiment of the invention, the system comprises a database being adapted to communicate with the network scheduler, the network scheduler is further adapted to transmit to the database a first identifier of the selected user and a second identifier of the second user, the first and second identifiers being associated in the database.

BRIEF DESCRIPTION OF THE DRAWINGS

An embodiment of the present invention is illustrated by way of example, and not by way of limitation, in the figures of the accompanying drawings, in which like reference numerals refer to similar elements and in which:

FIG. 5 describes a flowchart representing the steps of a method according to one embodiment of the invention carried out in the environment described on FIG. 4.

DETAILED DESCRIPTION OF ILLUSTRATIVE EMBODIMENTS

Figure 1:
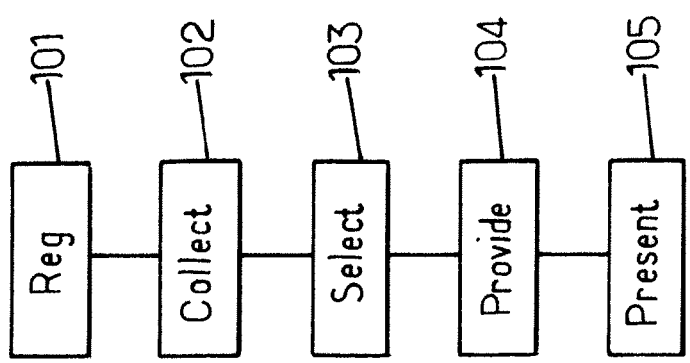
FIG. 1 represents a flowchart illustrating the steps of a method for connecting a first group of users from at least one first social network with users from a second social network, according to an embodiment of the invention.

Referring to FIG. 1, there is shown a flowchart illustrating the steps of a method for connecting a first group of users from at least one first social network with users from a second social network, according to an embodiment of the invention. The steps can be carried out by a network scheduler such as described on FIG. 2 for example.

At step 101, the first group of users is registered on the second social network as a generic first user. By 'generic' first user, it is meant a first user, which is defined as any other user with respect to second social network but which actually corresponds to a group of individuals. For example, the generic first user can refer to the workforce of an enterprise.

At step 102, a first message from a second user from the second social network intended to the generic first user is collected by the network scheduler.

At step 103 a user from the first group of users is selected by the network scheduler based on a predefined criterion. For example, the predefined criterion can be an availability of a user from the first group or a similarity between the second user sending the message and the selected user. For example, the network scheduler can select a user having an "online" status on the first social network. Indeed, it is common to store a plurality of personal information on social networks. Thus, the network scheduler can consider a common place or country in which both selected user and second user are living. No restriction is attached to the criterion that is predefined in order to select a user from the first group.

At step 104, the network scheduler provides the first message to the selected user and presents at a step 105 the second user as the sender of the first message.

Figure 2:
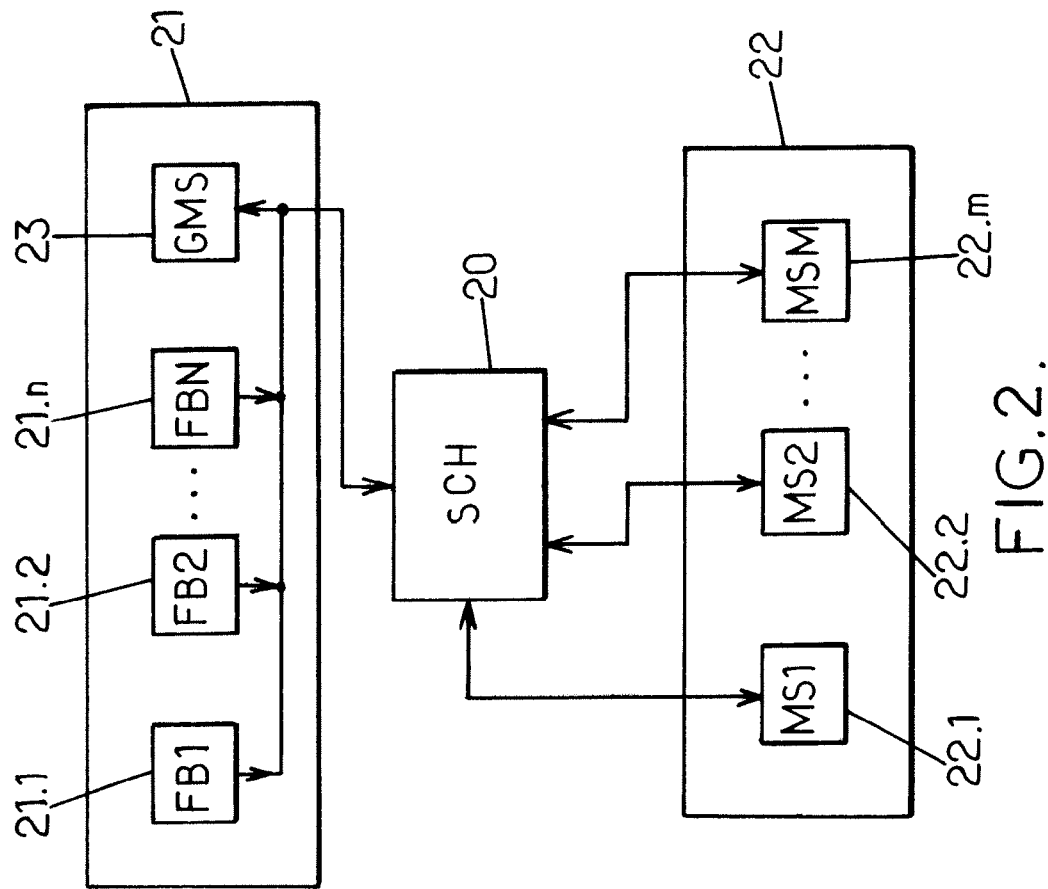
FIG. 2 illustrates a system according to one embodiment of the invention and for carrying out the steps described on FIG. 1.

Referring now to FIG. 2, there is shown a system according to an embodiment of the invention and for carrying out the steps described on FIG. 1.

The system comprises a network scheduler 20, a first social network 22 and a second social network 21. The first social network 22 comprises a plurality of m users 22.1-22.m which forms a first group of users. The network scheduler 20 is adapted to communicate with each of the user 22.1-22.m from the first social network 22.

The second social network 21 comprises a plurality of users 21.1-21.n and a generic first user 23, which registers the first group of users 22.1-22.m on the second social network 21.

In each social network, the users can communicate with one another, by sending messages for example. In the prior art, a user from the first network 22 cannot communicate with a user from the second network 21.

For example, users 21.1-21.n from the second social network 21 can be customers of an enterprise whereas the users 22.1-22.m from the first social network can be suppliers. Suppliers 22.1-22.m are then identified as a single user on the second social network 21 by means of the generic first user 23. Because generic first user 23 is a user from the second social network 21, it can receive messages from the customers 21.1-21.n without modifying the architecture of the existing social networks.

Each of the customers 21.1-21.2 can send a message to the generic first user 23. No restriction is attached to the communication means between the users of a given social network. Indeed, they depend on the means planned by the design of the social network, which can be updated or modified, without changing the implementation of the method according to an embodiment of the invention.

When the generic first user receives a first message sent by customer 21.1 for example, the scheduler is adapted to collect the first message. Then, based on a predefined criterion, the scheduler, which has a global view of the first group of users from the first social network 22, can select one of the suppliers 22.1-22.m as the receiver of the first message. This selection can be based on an availability of a supplier. For example, if supplier 22.1 is available, meaning if he does not have received a previous message from one of the customers 21.1-21.n or if he is online on the first social network, the network scheduler 20 can select him as the receiver of the first message. The selection can also be based on other criteria, as for example a compatibility between the profiles of the customer 21.1 and one of the suppliers 22.1-22.m. For example, in some businesses, it might be preferable that the customer and the supplier are located in the same country. In another embodiment, the network scheduler 20 takes into account a context information contained in the first message to determine a selected supplier among the suppliers 22.1-22.n.

Considering that the network scheduler 20 has selected supplier 22.1, the first message is provided to the supplier 22.1 and the customer 21.1 is presented as being the sender of the first message.

In response to the first message, the supplier 22.1 can send a second message intended to the customer 21.1 which has been identified in the first message as being the sender. The network scheduler 20 intercepts the second message and transmits it to the customer 21.1. In one embodiment, the generic first group 23 is presented as the sender of the second message.

The present invention is not limited to the above described embodiment. Indeed, as illustrated on FIG. 3, the system can be adapted to a plurality of social networks by means of a customer scheduler 20.1 and a supplier scheduler 20.2.

Figure 4:
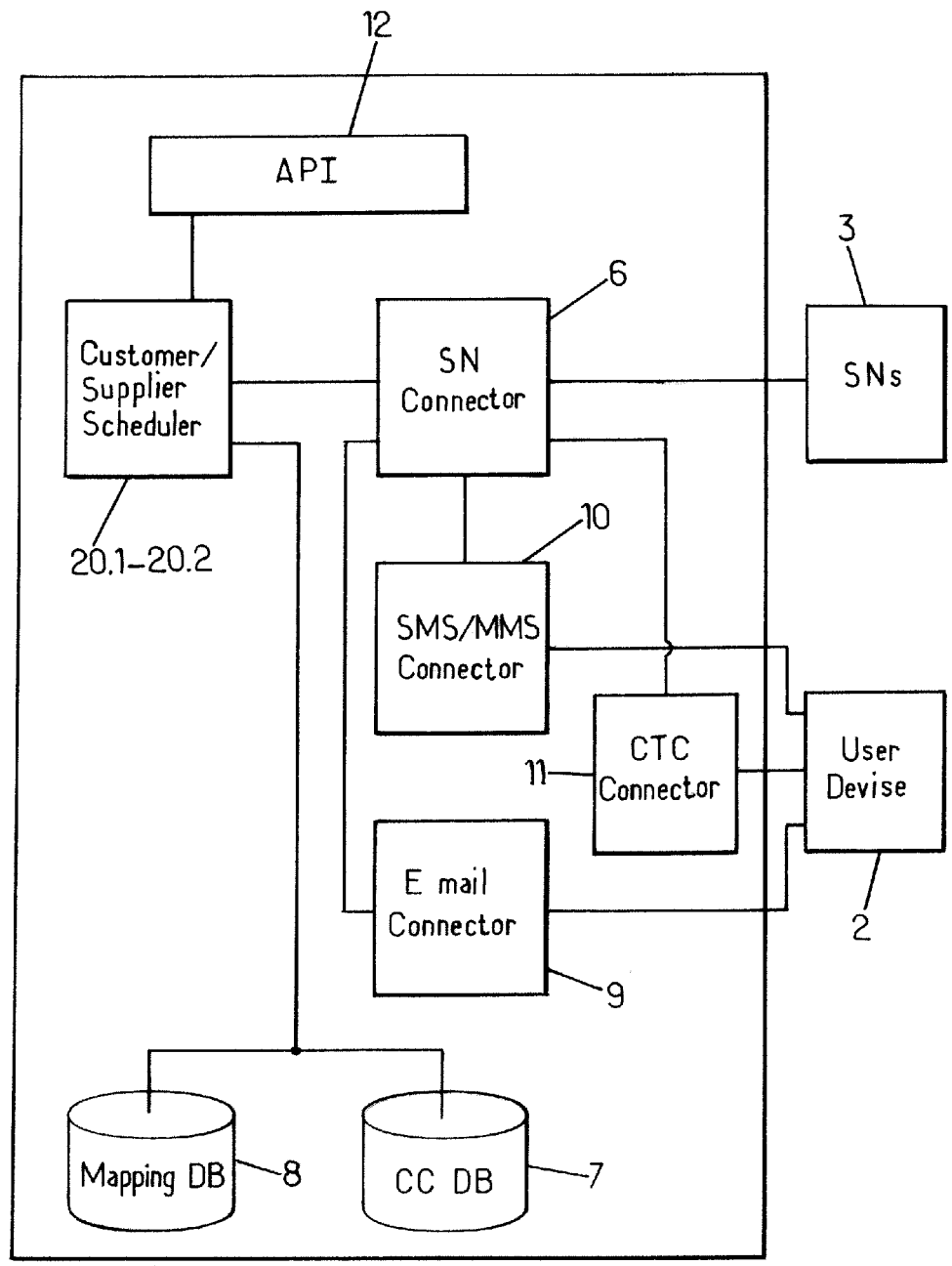
FIG. 4 illustrates an environment in which a method according to one embodiment of the invention is implemented.

Without any restriction, the previous example of connecting customers and suppliers is considered to describe FIG. 4. The second social network 21 and a third social network 24 are used at the customer's side. The second social network 21 comprises customers 21.1, 21.2 and 21.3. The third social network 24 comprises customers 24.1 and 24.2.

The first social network 22 and a fourth social network 25 are used on the supplier's side. The first social network 22 comprises suppliers 22.1, 22.2 and 22.3. The fourth social network 25 comprises suppliers 25.1, 25.2 and 25.3.

In addition, according to an embodiment of the invention, generic groups are used to identify customers at the supplier's side and to identify suppliers at the customer's side. To this end, suppliers 25.1, 25.2, 25.3, 22.1, 22.2 and 22.3 are registered on the second network as the generic first user 23 and on the third social network 24 as a generic third user 28. Customers 21.1, 21.2, 21.3, 24.1 and 24.2 are registered on the first social network 22 as a generic second user 26 and on the fourth social network 25 as a generic fourth user 27.

The customer scheduler 20.1 is adapted to connect the generic first user 23 and the generic third user 24 with suppliers 25.1, 25.2, 25.3, 22.1, 22.2 and 22.3. The supplier scheduler 20.2 is adapted to connect the generic second user 26 and the generic fourth user 27 with customers 21.1, 21.2, 21.3, 24.1 and 24.2. Furthermore, the supplier scheduler 20.2 is connected to the customer scheduler 20.1.

Considering that customer 24.2 of the third social network 24 sends a third message to the generic third user 28 registering suppliers 25.1, 25.2, 25.3, 22.1, 22.2 and 22.3, the customer scheduler 20.1 intercepts the third message and selects a supplier among suppliers 25.1, 25.2, 25.3, 22.1, 22.2 and 22.3 on the basis of the predefined criterion. No restriction is attached to the type of criterion considered here, as previously stated.

Considering that customer scheduler 20.1 selects supplier 25.2 of the fourth social network 25, the third message is transmitted to supplier 25.2. In one embodiment of the invention, customer 24.2 is presented as the sender of the third message. In another embodiment, generic fourth user 27, which registers customers 21.1, 21.2, 21.3, 24.1 and 24.2 on the fourth social network 25, is presented as the sender of the third message, thus ensuring confidentiality for customer 24.2.

In response to the third message, supplier 25.2 can send a fourth message intended to customer 24.2, if presented as the sender of the third message, or intended to the generic fourth user 27.

In one embodiment, if the fourth message is intended to generic fourth user 27, the supplier scheduler 20.2 is adapted to consult a database to determine that the message is to be transmitted to customer 24.2. This embodiment will be further detailed in the description of FIGS. 4 and 5. The fourth message is intercepted by supplier scheduler 20.2 and transmitted to customer 24.2. In one embodiment of the invention, supplier 25.2 is presented as the sender of the third message. In another embodiment, generic third user 28, which registers suppliers 25.1, 25.2, 25.3, 22.1, 22.2 and 22.3 on the third social network 24, is presented as the sender of the fourth message, thus ensuring confidentiality for customer supplier 25.2.

No restriction is attached to the type of social networks 21, 22, 24 and 25. Indeed, an embodiment of the present invention enables to connect users from different networks, regardless of the architecture of the social networks that are connected.

Referring to FIG. 4, there is shown an environment in which a method according to one embodiment of the invention can be implemented.

A plurality 3 of social networks, such as LinkedIn™, Facebook™, Myspace™, Twitter™, Bebo™ or content social networks such as Youtube™ for example, are connected to each other by a customer/supplier scheduler 20.1-20.2 adapted to carry out the method according to an embodiment of the invention, through a social network connector 6. The customer/supplier scheduler 20.1-20.2 can be connected to a web service layer 12, comprising basic applications that are exposed to the enterprises or to the suppliers in order to create services for supporting their customers. Services can be exposed via a graphical user interface for example.

The customer/supplier scheduler 20.1-20.2 can also be connected to a connector layer comprising the social network connector 6, a SMS/MMS connector 10, an email connector 9 and a voice connector 11.

The social network connector 6 is adapted to maintain different accounts for customers and suppliers who are registered on different social networks 3. The social network connector 6 is responsible for interacting with various existing social networks using the public or private applications of these social networks. Also, the social network connector 6 is responsible for retrieving and sending information from or to social networks under the direction of the customer/supplier scheduler 20.1-20.2.

The SMS/MMS connector 10 is interacting with a user device 2 for receiving or sending message information to the user device 2. The user device 2 can be a supplier device or a customer device and can interface with the social network connector 6 for sending and retrieving information.

The email connector 9 is responsible for interacting with the user device 2 for receiving or sending information message via email to the user of the device. To this end, the email connector 9 can be connected to the customer or supplier email accounts and can interface with the social network connector 6 for sending and retrieving information.

The voice connector 11 can be responsible for interacting with the user of the user device 2 for any voice related communication, such as calls. For example, the calls can originate from a customer or a supplier and can be converted to text and back to speech so that the voice connector 11 can be connected with the social network connector 6.

The plurality of connectors enables a connectivity of the customers and suppliers at all times and everywhere. Indeed, the suppliers can be connected to the customers via multiple communication means such as social networks, calls, messaging, and thus, an embodiment of the present invention provides suppliers with the flexibility to connect to customers via any communication means at any time. Furthermore, as the way of new communication mechanisms evolves, new connectors can be added so that a user is contactable via the new communication mechanism.

Figure 3:
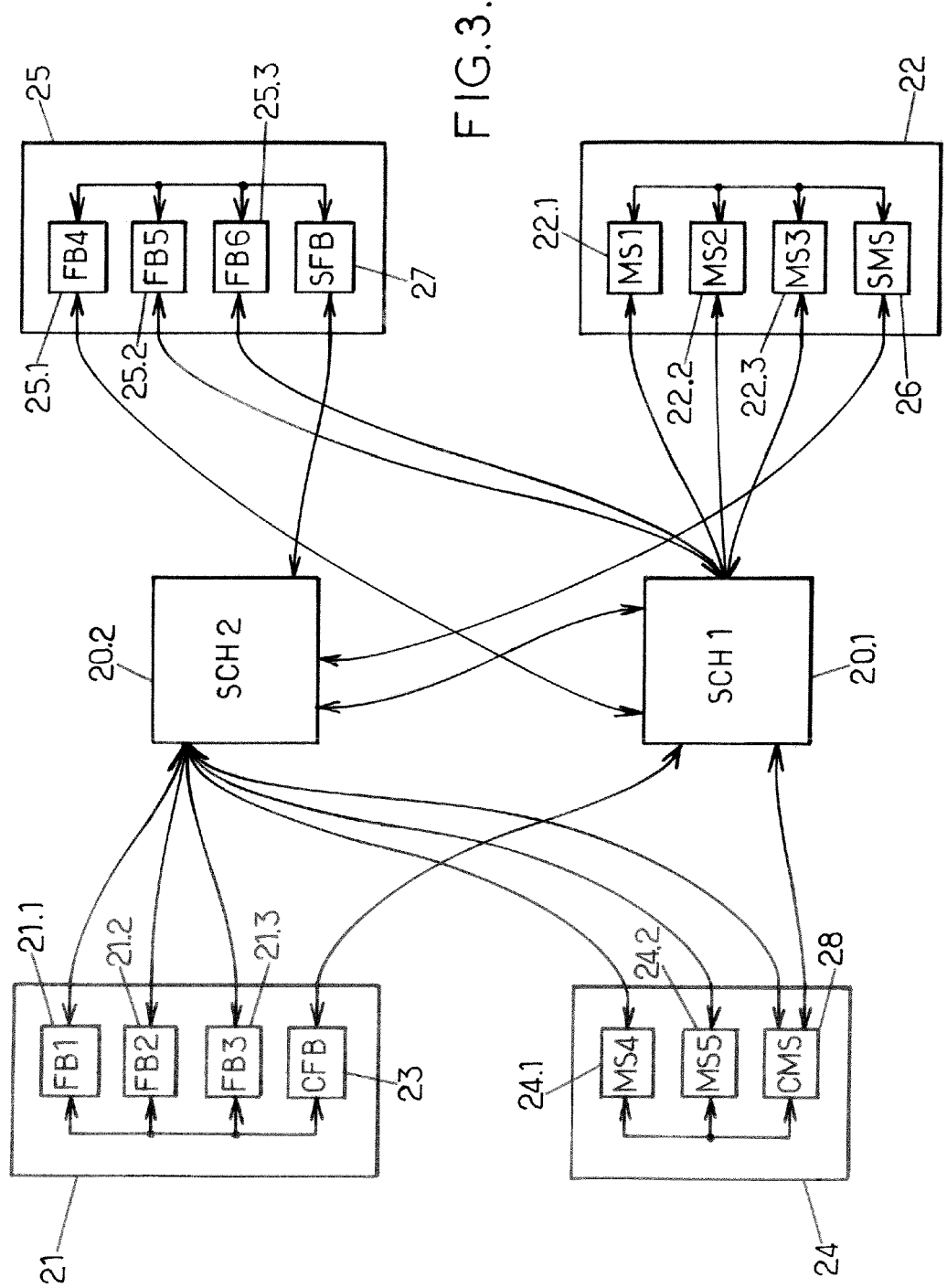
FIG. 3 describes a system according to one embodiment of the invention.

The customer/supplier scheduler 20.1-20.2 can comprise the customer scheduler 20.1 and the supplier scheduler 20.2 illustrated on FIG. 3.

The customer scheduler 20.1 can be considered as the master scheduler and is responsible for polling the social networks accounts of customers with the help of the social network connector 6. Further, on receiving a message (or information) from any of the customer account, the customer scheduler 20.1 checks in a mapping database 8 if a supplier has already been assigned to this customer. If nobody has been previously assigned, the customer scheduler 20.1 can invoke the supplier scheduler 20.2 to detect presence of workforce among the suppliers. For example, the supplier scheduler 20.2 can inform the customer scheduler 20.1 of the suppliers that are online on the different social networks 3. The customer scheduler 20.1 selects and assigns a workforce account to the customer and stores this assignment on the mapping database 8. For example, the customer scheduler 20.1 can transmit an identifier of the customer and an identifier of the selected supplier, which are then associated in the mapping database 8. The message sent by the customer is transmitted to the supplier account via the social network connector 6. The customer scheduler 20.1 can instruct the supplier scheduler 20.2 to poll for any message received from the selected supplier account. This process can be continued and after a configured time period, the customer scheduler 20.2 stops the polling of the selected supplier account.

The supplier scheduler 20.2 can be considered as the slave scheduler and is responsible for monitoring the presence of suppliers with the help of connectors and informing the customer scheduler 20.1. The supplier scheduler 20.2 is also responsible for polling for messages from a supplier based on a request by the customer scheduler 20.1. The supplier scheduler 20.2 can also send content to the customer scheduler 20.1. On receiving message from a supplier account, the supplier scheduler 20.2 transmits the message to a customer by checking an association in the mapping database 8. In one embodiment, after a predefined time period, the supplier scheduler 20.2 can delete the mapping or associations stored in the mapping database 8.

The mapping database 8 can be stored by the customer scheduler 20.1 and can host the mapping between customer accounts and supplier accounts, thus helping the schedulers 20.1-20.2 to know which supplier is serving a given customer of the enterprise.

The customer/supplier database 20.1-20.2 can also be connected to a community centre database 7 which can store different interface points that are exposed by the enterprise for their customers and suppliers. In addition, the community centre database 7 can store the supplier accounts that the enterprise exposes to their workforce. Polling of these accounts can be done by respective schedulers.

Referring to FIG. 5, there is shown a flowchart representing the steps of a method according to an embodiment of the invention carried out in the environment described on FIG. 4.

At step S1a, the enterprise defines social networks, for example Facebook™ and Twitter™, which are attributed to the customers. At step S1b, the enterprise defines a social network, for example Facebook™, which is attributed to the suppliers. No restriction is attached to the number or type of social networks that are attributed to suppliers or customers.

At step S2, the web service layer 12 stores the attributions made at steps S1a and S1b in the centre community database 7.

At step S3, the enterprise can login the accounts of suppliers and customers using the customer scheduler 20.1.

At step S4, the customer scheduler 20.1 polls for social network activity on all the accounts, namely on Facebook™ and on Twitter™, with the help of the social network connector 6. In this example, at step S5, the customer scheduler 20.1 receives messages from customers A and B, which accounts are registered on Twitter™.

The customer scheduler 20.1 can check, at a step S6, in the mapping database 8 if a supplier is already serving customers A and B.

If no supplier is already serving customers A and B, the supplier scheduler 20.2 is invoked by the customer scheduler 20.1.

At step S8, the supplier scheduler 20.2 can check on Facebook™ which suppliers are online. In this example, suppliers C and D are online.

At step S9, the supplier scheduler 20.2 sends information to customer scheduler 20.1 relating to the availability of suppliers C and D.

At step S10, the customer scheduler 20.1 provides the message from customer A to supplier C and the message from customer B to supplier D and sends reports to the mapping database 8, so that it can store that customer A and supplier C have been associated and that customer B and supplier D have been associated.

At step S11, the supplier scheduler 20.2 polls messages from the supplier accounts using the social network connector 6. In this example, supplier C sends a message. The supplier scheduler 20.2 then checks in the mapping database 8 which customer is to be served by supplier C. On receiving the message from supplier C, the supplier scheduler 20.2 sends the message to customer A. In a similar way, a message from supplier D is transmitted by the supplier scheduler 20.2 to customer B.

At step S12, the process can be repeated and polling continued by the customer scheduler 20.1 and by the supplier scheduler 20.2.

After the predefined time period, the supplier scheduler 20.2 can delete the mapping stored in the mapping database 8.

As an extension of an embodiment of the present invention, such a system can be connected to entities or enablers that are responsible for personalized delivery of events in converged Telco and Web World as per the users' needs. In such cases, an embodiment of the present invention will accommodate for the delivery of the messages in a personalized way. For these scenarios, message delivery can be intercepted and follow rules that are instructed by the entities or enablers that are responsible for personalization. An embodiment of the present invention is a way of utilizing assets from Telco and Web World resulting in converged solutions for users.

An embodiment of the current invention will offer end users of ISPs or operators the capability of communicating with their contacts using their social network account even if their contact is not a member of the same social network.

An embodiment of the present invention can apply to enterprises having existing call centres and/or enterprises that wish to create new customer service. Enterprises with existing customer service can also use the present invention to integrate the new trend of social networks into their customer service.

Indeed, an embodiment of the present invention enables connecting different communities, as for example customer communities and supplier communities from different social networks, thus ensuring that problems from the customer communities are catered by the supplier communities and thus offering to the enterprise numerous benefits such as low cost solution for call centres, connectivity in disaster scenarios and flexibility of work force geographically dispersed. In addition, enterprises that wish to create new customer service can implement an embodiment of the present invention and accommodate it for their customer base to be connected to their supplier base via social networks, calls and messaging communication mechanisms. An embodiment of the present invention is also reusable as it can utilize existing Telco assets such as voice mail, SMS, messaging as well as web assets such as social networking.

Furthermore, an enterprise can benefit by offering improved interactivity between their business customers, suppliers, partners and other communities, because they have the flexibility to communicate via their existing social networks with different social networks of the enterprise transparently by means of an embodiment of the present invention. In addition, a permanent connectivity is ensured with different business enterprises related to the enterprise and sending enterprise upgrades, promotional offers to other business communities related to the enterprise is enhanced. Besides, the enterprise can benefit by getting statistics and feedback about the relationships between various communities by means of an embodiment of the present invention.

An embodiment of the present invention can also enable providing educational service. Indeed, individuals who are using content oriented social networks, such as Youtube™ for example, can be offered a more interactive experience by means of an embodiment of the present invention. For example, users viewing Youtube™ content for learning purposes or developing skills can contact content owners and have discussions on any difficulties they might have encountered, through the use of an embodiment of the present invention, which can be extended to online educational centres where people can provide services to communities that seek education.

Although the present disclosure has been described with reference to one or more examples, workers skilled in the art will recognize that changes may be made in form and detail without departing from the scope of the disclosure and/or the appended claims.

The invention claimed is:

1. A method comprising:
connecting a first group of users from at least one first social network with users from at least one second social network that is different from the at least one first social network, the first group of users being registered on the second social network as a first user, the method further comprising the following steps carried out by a network scheduler device:
collecting a first message sent by at least one second user to the first user within the second social network, wherein the first message is ultimately delivered to at least one user of the first group of users on the at least one first social network, and wherein the collecting of the first message is carried out when the first message is received by the first user within the second social network, and wherein the at least one second user comprises at least one user of a second group of users from the second social network, the second group of users being registered on the first social network as a second user;

upon collecting the first message, selecting a user from the first group of users based on a predefined criterion; and providing the first message from the network scheduler device to the selected user and presenting the second user as a sender of the first message.

2. The method as set forth in claim 1, further comprising:
intercepting a second message sent from the selected user and intended for the second user; and
providing the second message to the second user and presenting the first user as a sender of the second message.

3. The method as set forth in claim 1, wherein the method further comprises:
transmitting to a database adapted to communicate with the network scheduler device a first identifier of the selected user and a second identifier of the second user, said first and second identifiers being associated in the database;
collecting a third message from a third user from the second social network intended for the first user; and
if an identifier of the third user is associated with an identifier of a given user of the first group of users in the database, providing the third message to the given user and presenting the third user as a sender of the third message.

4. The method as set forth in claim 3, wherein, a time period being predefined, the associated first and second identifiers are deleted in the database after every time period.

5. A non-transitory storage medium comprising a computer program product recorded thereon and executable by a computer in the form of a software agent including at least one software module setup to implement a method of connecting a first group of users from at least one first social network with users from at least one second social network that is different from the at least one first social network, the first group of users being registered on the second social network as a first user, the method further comprising the following steps:
collecting with a network scheduler device a first message sent by at least one second user to the first user within the second social network, wherein the first message is ultimately delivered to at least one user of the first group of users on the at least one first social network, and wherein the collecting of the first message is carried out when the first message is received by the first user within the second social network, and wherein the at least one second user comprises at least one user of a second group of users from the second social network, the second group of users being registered on the first social network as a second user;
upon collecting the first message, selecting with the network scheduler device a user from the first group of users based on a predefined criterion; and
providing the first message from the network scheduler device to the selected user and presenting the second user as a sender of the first message.

6. A system comprising:
a connector layer connecting a first group of users from at least one first social network with users from at least one second social network that is different from the at least one first social network, the first group of users being registered on the second social network as a first user;
a non-transitory mapping database storing mappings between users from the first social network and the first group of users from the first social network;
a network scheduler communicatively coupled to the connector layer and comprising:
a receiver, which collects a first message sent by at least one second user to the first user within the second social network, wherein the first message is ultimately delivered to at least one user of the first group of users on the at least one first social network, and wherein the receiver collects the first message when the first message is received by the first user within the second social network, and wherein the at least one second user comprises at least one user of a second group of users from the second social network, the second group of users being registered on the first social network as a second user;
a selecting unit, which selects a user from the first group of users based on a predefined criterion upon collection of the first message by the receiver by checking the mapping database; and
a transmitter, which provides the first message to the selected user and presents the second user as a sender of the first message.

7. A system comprising:
at least one first social network;
at least one second social network that is different from the at least one first social network;
a connector layer connecting a first group of users from the first social network with users from the second social network, the first group of users being registered on the second social network as a first user;
a non-transitory mapping database storing mappings between users from the first social network and the first group of users from the first social network;
a network scheduler communicatively coupled to the connector layer and comprising:
a receiver, which collects a first message sent by at least one second user to the first user within the second social network, wherein the first message is ultimately delivered to at least one user of the first group of users on the at least one first social network, and wherein the receiver collects the first message when the first message is received by the first user within the second social network, and wherein the at least one second user comprises at least one user of a second group of users from the second social network, the second group of users being registered on the first social network as a second user;
a selecting unit, which selects a user from the first group of users based on a predefined criterion upon collection of the first message by the receiver by checking the mapping database; and
a transmitter, which provides the first message to the selected user and presents the second user as the sender of the first message.

* * * * *